United States Patent [19]
Farmery

[11] 3,904,118
[45] Sept. 9, 1975

[54] AGRICULTURE SPRAY BOOMS

[76] Inventor: Horstine Farmery, North Newbald, York, England

[22] Filed: Sept. 30, 1974

[21] Appl. No.: 510,668

[30] Foreign Application Priority Data
Sept. 28, 1973 United Kingdom............... 45465/73

[52] U.S. Cl. .................. 239/165; 239/176; 239/175
[51] Int. Cl.............................................. B05b 1/20
[58] Field of Search ........................... 239/159–169, 239/175, 176, 264, 265, 280.5, 587, 588

[56] References Cited
UNITED STATES PATENTS
| | | | |
|---|---|---|---|
| 1,147,546 | 7/1915 | Rees .................................... | 239/164 |
| 3,111,268 | 11/1963 | Butler ............................ | 239/164 X |
| 3,504,857 | 4/1970 | Ballu ............................... | 239/176 X |

FOREIGN PATENTS OR APPLICATIONS
| | | | |
|---|---|---|---|
| 1,056,306 | 1/1967 | United Kingdom................. | 239/164 |

*Primary Examiner*—Robert S. Ward, Jr.
*Attorney, Agent, or Firm*—William Anthony Drucker

[57] ABSTRACT

An agricultural spray boom for mounting on fixed structure carried by a power driven tractor or trailer and comprising two mutually hinged sections of which the inboard section is hinged to a mounting capable of rocking on a vertical axis relative to the fixed structure and the outboard section has at its hinged end an L-shape member connected by a rigid element to near its free end with the free end of said L-shape member connected by a cable to the fixed structure above the rockable mounting, and two further cables extend from the end of the inboard section remote from the rockable mounting to the respective ends of rigid parts of different length extending oppositely of the fixed structure at a point between the connection of the first mentioned cable thereto and the position of the rockable mounting, such that the boom may be displaced between inoperative position, with its two sections adjacent one another and extending substantially vertically relative to the fixed structure, and operative position with its sections in alignment and substantially horizontal with relative folding movement of the sections being a function of the rocking of the rockable mounting and the effect of the three cables and such that should the boom in operative position encounter an obstruction it may swing with rocking of the rockable mounting and partial folding of its sections to avoid damage.

4 Claims, 4 Drawing Figures

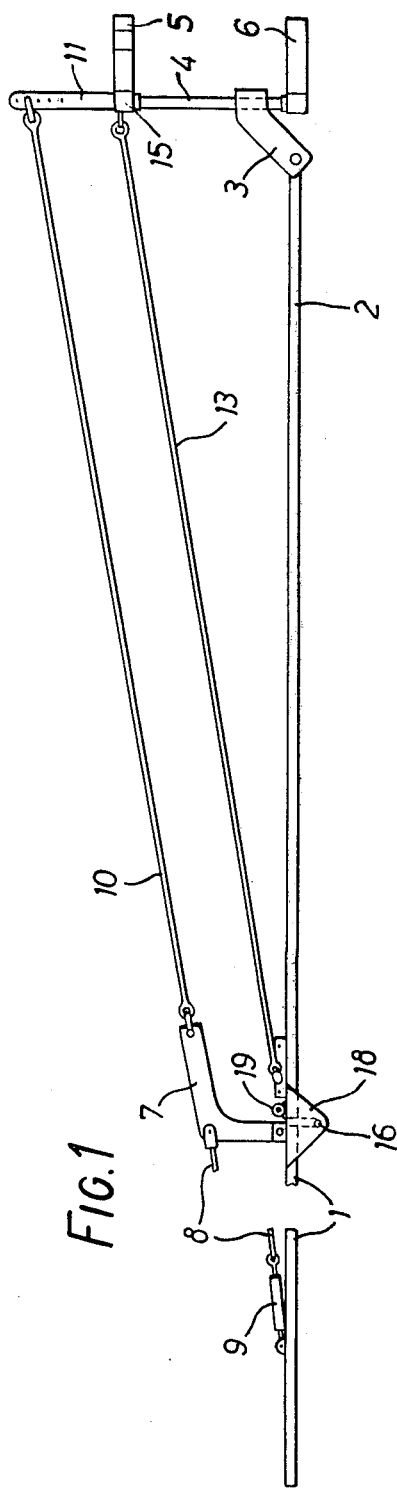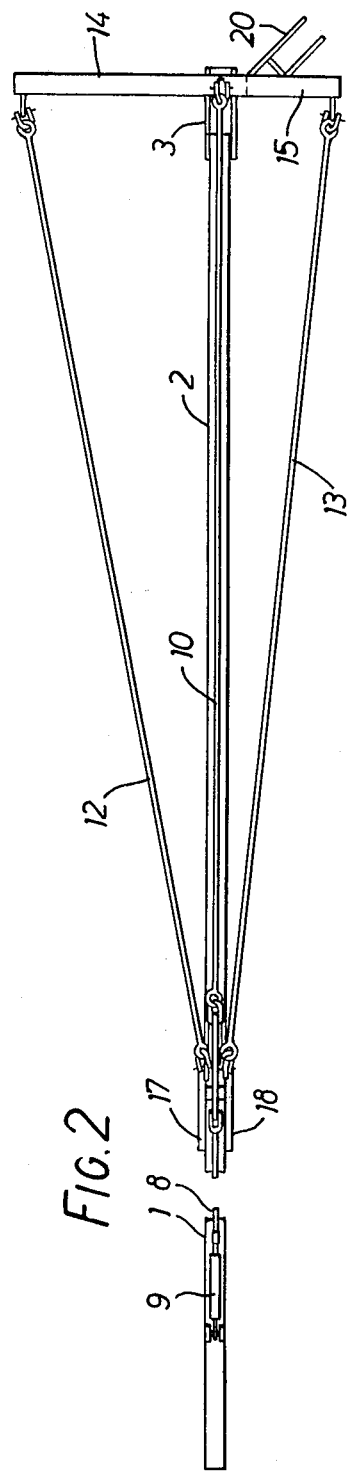

AGRICULTURE SPRAY BOOMS

BACKGROUND OF THE INVENTION

Agricultural spray booms, that is to say boom carrying conduits and spray nozzles for spraying liquid fertilisers, fungicides, pesticides and such like, which are mounted on tractors and tractor-towed wheeled assemblies, are well known and take a variety of forms, and as large areas have to be treated such booms are usually long and are carried extending to each side of the vehicle. The mounting of the two booms is usually such that their spread may be reduced by swinging up from horizontal to vertical position, and it is also known to provide swinging action of the boom in horizontal position to minimise damage should a boom encounter an obstruction while in use in extended condition. The swinging up of a pivoted boom gives difficulty in the effort required to effect such movement and disadvantage that liquid can drip onto the operator which is unpleasant and can be harmful with some chemical sprays in common use.

This invention relates to agricultural spray booms for mounting on tractors and trailer vehicles and has for its object to provide a foldable spray boom which may be simply and easily swung up into inoperative position with a minimum of effort without requiring the operator to move under any part of the boom and in arrangement such that desirable swinging action of the boom in operative position is possible in both forward and reverse drive to cater for the boom encountering an obstruction.

The boom according to the present invention comprises two mutually hinged sections of which the inboard section is hinged to a mounting capable of rocking on a vertical axis and the outboard section has at its hinged end an L-shape member connected by a rigid element to near its free end with the free end of said L-shape member connected by a cable to fixed structure appreciably above the mounting, and two further cables extend from the end of the inboard section remote from the mounting to the respective ends of parts of different length extending oppositely of the fixed structure at a point between the connection of the first mentioned cable thereto and the position of the mounting.

With the boom extended in operative position, its two sections, which are of substantially equal length and mass, are aligned and all three cables are under tension. The two cables connected to the inboard section serve to restrain the boom, in extended configuration, from yawing in a forward/rearwards directions, whilst at the same time, allowing a limited swing back in the event of the outboard section coming against an obstruction during forward motion. The boom will automatically return to centre-line due to the equilibrium of tension in the cables on removing the obstruction but if there is continued forward motion, the boom will partially fold and still return to the extended position upon release of the obstruction pressure thereon. To fold the boom fully into inoperative position, the free end may be manually swung to rock the mounting about its vertical axis, when one of the two cables connected to the inboard boom section slackens and the effect of the other cables is to cause the two sections to fold about their mutual pivot and about the hinge of the inboard section to the mounting, an action which continues the further the boom is swung about said vertical axis until the two sections come to almost vertical substantially parallel juxta position when they may be further rocked relatively to the mounting to locate them in a holding bracket, or the outboard section located between the limbs of a bracket on the inboard section provided for the purpose, and be in each case secured by a pin or holding strap to prevent unfolding. The continuous action of the cable connected to the L-shape member tends to stabilise the boom sections, particularly in the half folded condition, so that there is positive movement of the two sections relative to one another and to the mounting during both folding and unfolding. Thus as the inboard section arcs upwards during boom folding, the outboard section arcs downwards under its own weight with restraint by the cable connected to the L-shape member and hence the outboard section counterbalances and assists the folding to such an extent that the effort required to fold the boom sections is only a few pounds, that is to say the effort of an operator to swing the boom for folding is much less than having to swing up a section of a conventional folding boom and at no time does he come under the boom to be dripped on by liquid leaving the nozzles of the conduit carried by the boom.

The L-shape member is connected at the junction point of its limbs by the rigid element, which may be a steel rod, to near the end of the free end of the outboard section, and such member may be connected to the boom section for a degree of rocking movement relative thereto when the rigid element may incorporate length adjusting means effective to adjust the tension of the cable connected to the L-shape member.

The boom sections may be mutually hinged by an offset pivot carried between side plates fast on the end of the inboard section to tend to keep the sections in alignment one to another. A cable runner may also be provided near the end of the inboard section remote from its connection to the mounting with which the cable connected to the L-shape member may engage when the sections are closely folded.

For power operation, a jack may be provided to be effective between the mounting and the inboard section connected thereto to rock the latter upwardly about such connection with consequent folding downwards of the outboard section as it swings up.

The fixed structure and vertical pivot axis of the mounting are carried by a framework, which is mounted on a tractor or towable vehicle preferably so as to be capable of vertical positional adjustment, and such framework may be movable relative to fixed structure of the vehicle with the interposition of means for eliminating the transmission of shocks including rubber blocks and/or a torsion bar damper.

BRIEF DESCRIPTION OF THE DRAWINGS

FIG. 1 is a side elevation being a view from the rear of a boom extending from the left-hand side of a vehicle (not shown);

FIG. 2 is a plan looking down on FIG. 1;

DESCRIPTION OF THE PREFERRED EMBODIMENT OF THE INVENTION

Figure 3:
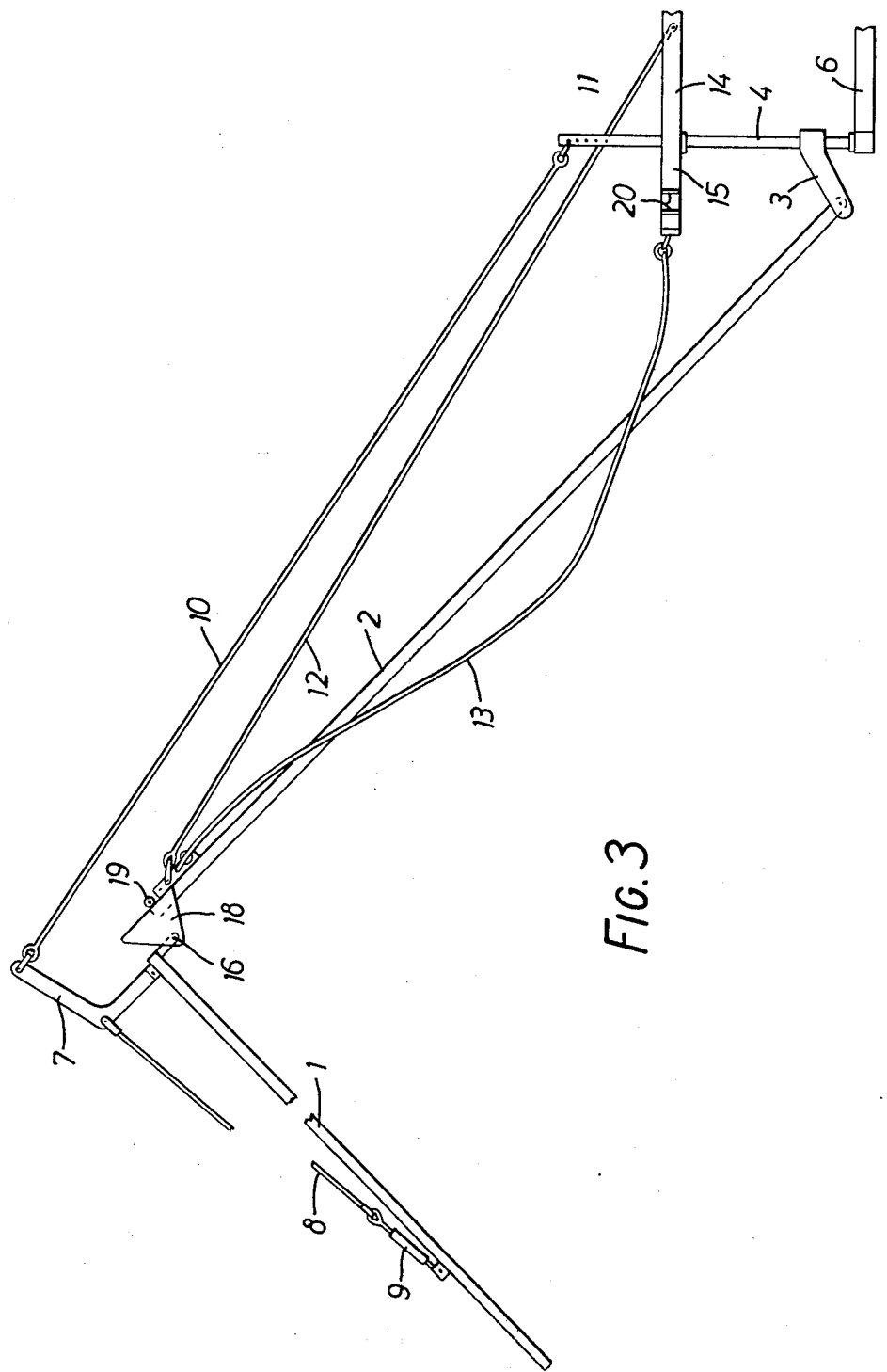
FIG. 3 is a view from the rear (similar to FIG. 1) showing the boom in half folded condition.

The boom comprises two sections of substantially the same length and equal mass, namely an outboard section 1 hingedly connected at one end to the end of an inboard section 2 with its other end hinged by a parallel axis connection to a mounting 3 capable of rocking about a vertical axis i.e. about the rod 4 carried between parallel members 5, 6 of fixed structure such as a framework carried by a vehicle (not shown). At the hinged end of the outboard section 1 is an upstanding (as seen in FIG. 1) L-shape member 7, the juction portion of the limbs of which is connected by a rod 8, preferably incorporating length adjusting means 9, to near the free end of the section 1. A cable 10 connects the end of the free-end limb of the L-shape member 7 to the fixed structure, i.e. to the upper end of a member 11 fast with the framework, at a point above where the mounting 3 is rockable on the rod 4. Two cables 12, 13 extend from the end of the inboard section 2 remote from its connection to the mounting 3 to the respective ends of members 14, 15 which extend oppositely of and normal to the member 11 at a point between the connection thereto of the cable 10 and the part of the rod 4 about which the mounting 3 may rock, and preferably nearer to the former so that the cables 12, 13 extend substantially parallel to the cable 10 when the boom is extended and as seen in FIG. 1. The member 14 is longer than the member 15, e.g. almost twice as long, and the folding action is by swinging the boom (anticlockwise as seen in FIG. 2) about the axis of the rod 4.

The boom sections 1, 2 are conveniently formed of inverted channel section members and are mutually pivotally connected by an off-set pivot at 16 carried between side plates 17, 18 which tend to keep the sections in alignment. A cable runner 19 may be provided on the upper surface at the end of the section 2.

Figure 4:
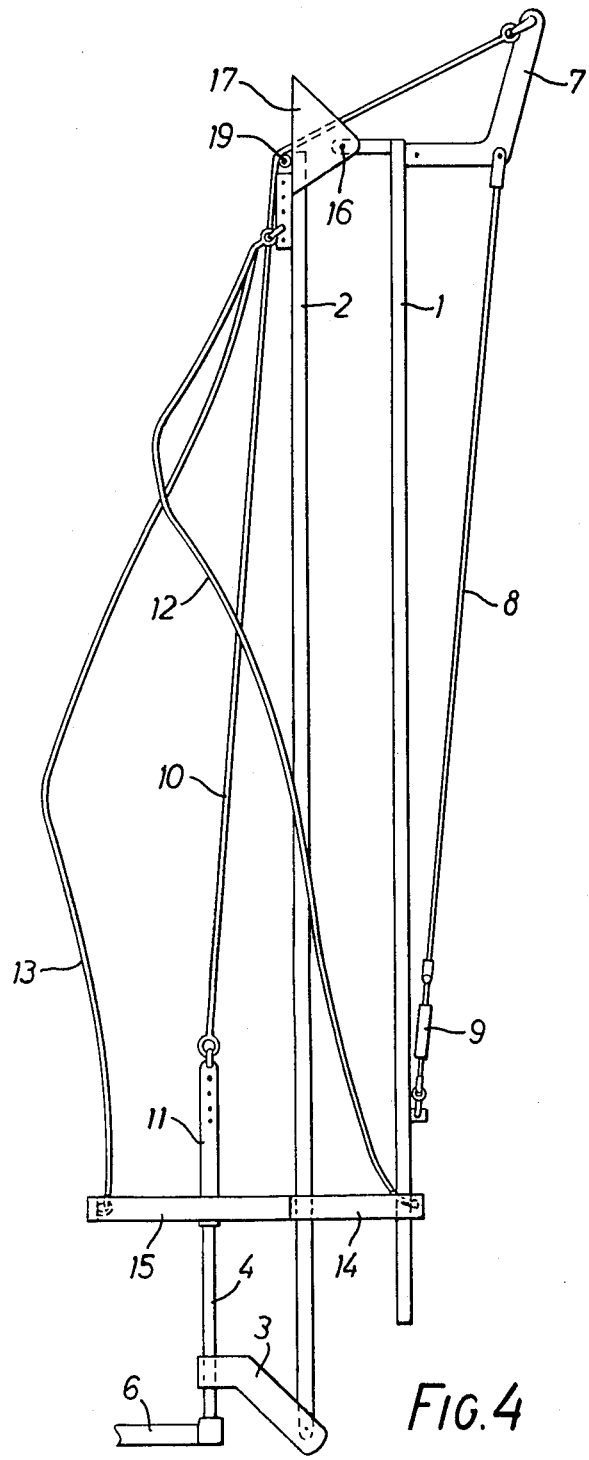
FIG. 4 is a view showing the boom in fully folded condition.

To fold the boom from its extended operative position as shown in FIGS. 1 and 2, the boom is swung anticlockwise as seen in FIG. 2 with rocking of the mounting 3 about the rod 4. This movement slackens the cable 13 and causes the cables 10, 12 to fold the sections 1, 2 about the pivot 16 and the pivot of the section 2 to the mounting 3 due to changes in the effective distances between the cable anchorages. Thus the inboard section 2 arcs upwardly about its pivotal connection to the mounting 3 and the outboard section 1 arcs downwardly about the pivot 16 due to its weight. The action continues the further the boom is so swung round, past the half way stage illustrated in FIG. 3 when the forces substantially balance and there is little tendency for self movement, through to folded condition illustrated in FIG. 4 when the sections 1 and 2 come into substantially parallel juxta position with the cable 10 still in tension and the other two cables 12, 13 slack.

The sections 1, 2 may now be further rocked about the pivotal connection to the mounting 3 to locate the sections between the limbs of a bracket 20 (see FIG. 2) to be secured by a pin or securing strap.

To unfold the boom, it is merely necessary to pull them from the bracket 20 and move the free end of the outboard section 1 towards operative position with rocking of the mounting 3 and simultaneous rocking movement of the sections about the hinge connections until they assume operative position in which the three cables 10, 12 and 13 hold them in alignment and parallel to the ground and the cables 12 and 13 prevent the boom from yawing either forwards or rearwards except when pressure is applied manually to swing the boom to bring about folding and when the boom, and particularly the outboard section 1, meets an obstruction and it is rocked with partial folding so avoiding damage.

Instead of being directly mounted on a tractor, the framework carrying a spray unit comprising two oppositely extending booms may be mounted on a tractor-towed wheeled assembly, on which a tank for liquid to be sprayed may also be mounted together with a pump adapted to be driven from the tractor power take-off.

I claim:

1. An agricultural spray boom for mounting on fixed structure carried by a vehicle, including an outboard boom section having first and second ends, an inboard boom section having first and second ends, pivot means connecting said second end of said outboard section to said first end of said inboard section, a rockable mounting rockable about a vertical axis relative to said fixed structure, pivot means connecting said second end of said inboard section to said rockable mounting, an L-shape member with a free end carried by said outboard section adjacent said second end thereof, a rigid member connecting said L-shape member and a point adjacent said first end of said outboard section, a first cable connecting said free end of said L-shape member to said fixed structure at a point above said rockable mounting, two oppositely extending members of different length each with a free end and carried by said fixed structure at a point between the attachment of said first cable and said rockable structure, and second and third cables of substantially equal length and connected to near said first end of said inboard section and to said free ends of said oppositely extending members respectively.

2. An agricultural spray boom as claimed in claim 1, in which said pivot means connecting said inboard and outboard sections is an offset pivot pin extending between a pair of plates carried at said first end of said inboard section.

3. An agricultural spray boom as claimed in claim 1, in which said rigid member connecting said L-shape member to said first end of said outboard section is a steel rod.

4. An agricultural spray boom as claimed in claim 1 including a cable runner provided at said first end of said inboard section and engageable by said first cable as said inboard and outboard sections approach folded condition.

* * * * *